(12) United States Patent
Mochizuki et al.

(10) Patent No.: US 9,256,354 B2
(45) Date of Patent: Feb. 9, 2016

(54) LIST DISPLAY APPARATUS

(75) Inventors: Arito Mochizuki, Tokyo (JP); Kuniaki Oe, Kanagawa (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 96 days.

(21) Appl. No.: 13/491,948

(22) Filed: Jun. 8, 2012

(65) Prior Publication Data

US 2012/0317513 A1 Dec. 13, 2012

(30) Foreign Application Priority Data

Jun. 13, 2011 (JP) .................................. 2011-131176

(51) Int. Cl.
*G06F 3/048* (2013.01)
*G06F 3/00* (2006.01)
*G06F 3/0485* (2013.01)
*G06F 3/0488* (2013.01)

(52) U.S. Cl.
CPC .......... *G06F 3/0485* (2013.01); *G06F 3/04883* (2013.01)

(58) Field of Classification Search
CPC ... G06F 3/0485; G06F 3/0482; G06F 3/0481; G06F 3/04855; H04M 1/72583
USPC ....................................................... 715/830
See application file for complete search history.

(56) References Cited

U.S. PATENT DOCUMENTS

| | | | |
|---|---|---|---|
| 7,590,946 B2 | 9/2009 | Okamura | |
| 2003/0043174 A1* | 3/2003 | Hinckley et al. | 345/684 |
| 2003/0128192 A1 | 7/2003 | van Os | |
| 2006/0212829 A1* | 9/2006 | Yahiro et al. | 715/810 |
| 2007/0130525 A1* | 6/2007 | Murphy et al. | 715/747 |
| 2008/0104544 A1* | 5/2008 | Collins et al. | 715/846 |
| 2008/0155461 A1 | 6/2008 | Ozaki | |
| 2008/0195972 A1* | 8/2008 | Lacey | G06F 3/0482 715/817 |
| 2008/0196046 A1* | 8/2008 | Athas et al. | 719/320 |
| 2009/0100373 A1 | 4/2009 | Pixley et al. | |
| 2010/0269038 A1* | 10/2010 | Tsuda | 715/702 |
| 2012/0036455 A1* | 2/2012 | Holt et al. | 715/753 |

OTHER PUBLICATIONS

"Using PlayStation 3", indexed to Google Aug. 14, 2010 and published at www.ign.com/wikis/playstation-3/Using_PlayStation_3, retrieved via Google on Dec. 4, 2014.*

(Continued)

*Primary Examiner* — Doon Chow
*Assistant Examiner* — Shourjo Dasgupta
(74) *Attorney, Agent, or Firm* — Katten Muchin Rosenman LLP

(57) ABSTRACT

Provided is a list display apparatus configured to: arrange, from a list including a plurality of item images arranged in order, item images included in a partial range of the list in a predetermined scroll direction, and display the item images in the partial range on a screen; and move the item images in the scroll direction at a speed corresponding to a user's scroll instruction, and move item images that have not been displayed on the screen in the scroll direction from outside of the screen into the screen so as to newly display the item images on the screen. When the item image that is newly displayed is moved in the scroll direction into the screen, at least a part of the item image is moved in a cross direction crossing the scroll direction from the outside of the screen into the screen at a predetermined speed.

6 Claims, 8 Drawing Sheets

(56) References Cited

OTHER PUBLICATIONS

European Search Report dated Oct. 12, 2012, from corresponding European Application No. 12171389.5-2211.

Chinese Office Action dated May 23, 2014 from corresponding Application No. 201210194858.7.

* cited by examiner

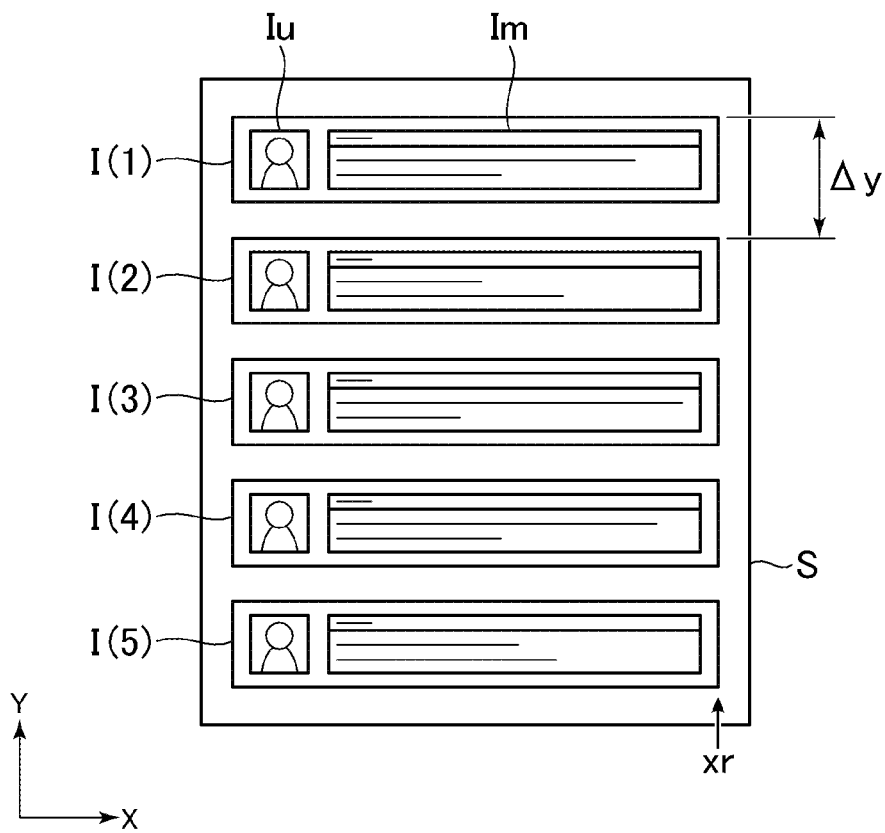
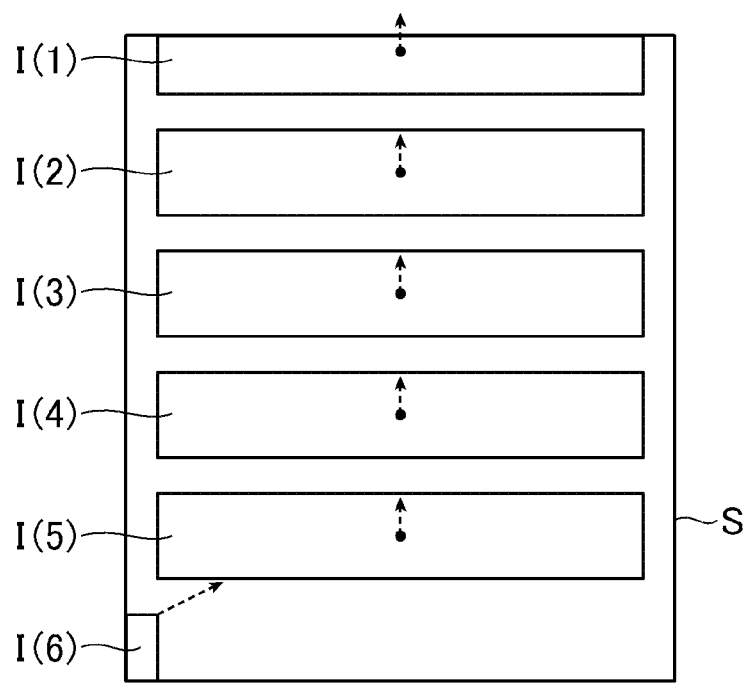

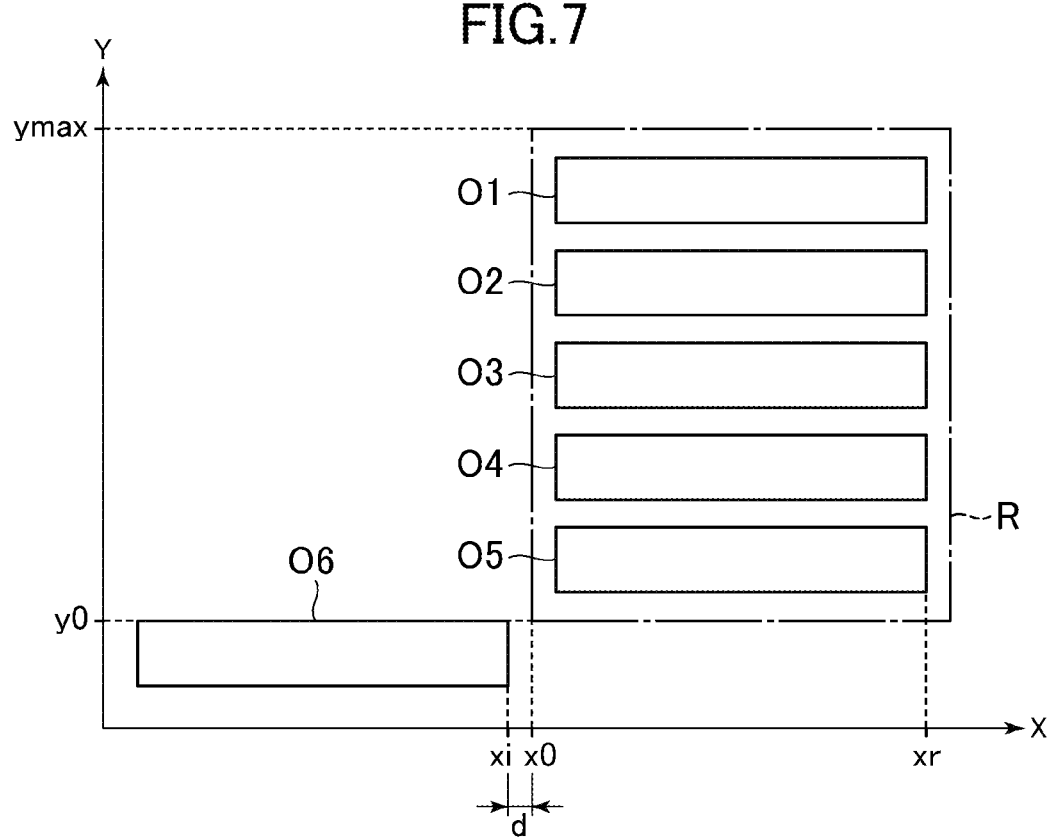
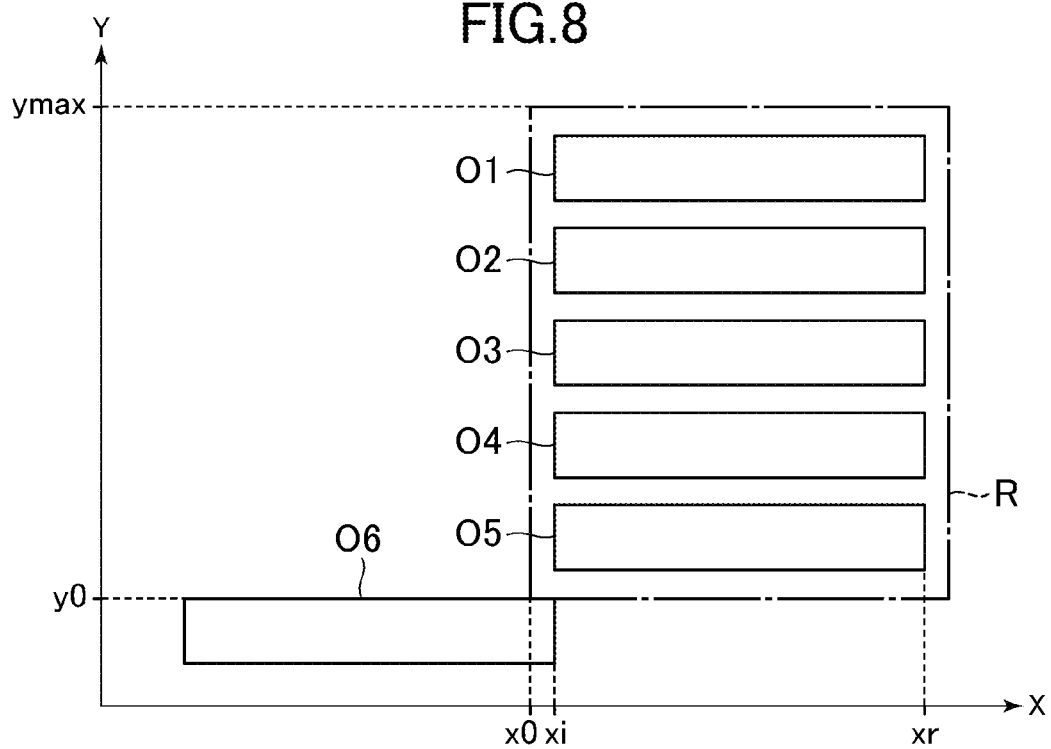

LIST DISPLAY APPARATUS

CROSS-REFERENCE TO RELATED APPLICATION

The present application claims priority from Japanese application JP 2011-131176 filed on Jun. 13, 2011, the content of which is hereby incorporated by reference into this application.

BACKGROUND OF THE INVENTION

1. Field of the Invention

The present invention relates to a list display apparatus for displaying a list including a plurality of items, a list display control method, and an information storage medium storing a program for realizing the method.

2. Description of the Related Art

There is a case where many items, such as messages posted by a plurality of users and a plurality of music data, are to be displayed on a screen. In this case, the following user interface technology is often adopted. A plurality of items sorted by various criteria are arranged in a list one-dimensionally. Some items included in a range to be displayed are displayed on the screen, and the range to be displayed is moved in accordance with a user's scroll operation. For instance, if the screen is a touch screen, the user can scroll items displayed on the screen by sliding a user's finger on the screen so as to instruct the scroll operation. According to this user interface, even if all items cannot be displayed on the screen at one time, the user can obtain a display of arbitrary items in the list on the screen by the scroll operation.

However, according to the above-mentioned user interface technology, when the scroll operation is performed to largely move the range to be displayed in the list, a processing load is increased because it is necessary to render all the items passing through the range to be displayed while the scroll operation is performed. Then, if rendering of each item takes long time, a speed of the scroll operation may be restricted because the rendering process is delayed. On the other hand, if there is no rendering of items in the range to be displayed while the scroll operation is performed, the user cannot grasp what extent the range to be displayed is moving by the scroll operation from the screen display. As a result, it becomes difficult to obtain a display of desired items on the screen by the scroll operation.

SUMMARY OF THE INVENTION

The present invention has been made in view of the above-mentioned problem, and it is an object thereof to provide a list display apparatus, a list display control method, and an information storage medium storing a program for realizing the method, in which a load of rendering process during a scroll operation can be reduced.

According to an exemplary embodiment of the present invention, there is provided a list display apparatus including: a list display control portion for arranging, from a list including a plurality of item images arranged in order, item images included in a partial range of the list in a predetermined scroll direction, and displaying the item images in the partial range on a screen; and a scroll control portion for moving the item images displayed on the screen in the scroll direction at a speed corresponding to a user's scroll instruction, and moving item images that have not been displayed on the screen in the scroll direction from outside of the screen into the screen so as to newly display the item images on the screen. When the scroll control portion moves the item image that is newly displayed in the scroll direction into the screen, the scroll control portion moves at least a part of the item image in a cross direction crossing the scroll direction from the outside of the screen into the screen at a predetermined speed.

According to the exemplary embodiment of the present invention: each of the plurality of item images may include a plurality of display elements arranged in the cross direction; the list display apparatus may further include an item image rendering portion for rendering each of the plurality of display elements included in the item image that is newly displayed on the screen by the scroll control portion; and the item image rendering portion may exclude, from among the plurality of display elements, a display element that is not displayed on the screen in a period during which the newly displayed item images pass the screen from a target of rendering.

Further, in the list display apparatus according to the exemplary embodiment of the present invention, the scroll control portion may move the newly displayed item image in the cross direction starting from an initial position at which an end of the newly displayed item image in the cross direction is included in the screen.

Further, in the list display apparatus according to the exemplary embodiment of the present invention, the scroll control portion may start moving the item image newly displayed in the cross direction when a predetermined delay time has elapsed after a position of the newly displayed item image in the scroll direction is included in the screen.

Further, according to an exemplary embodiment of the present invention, there is further provided a list display control method including: a list display control step for arranging, from a list including a plurality of item images arranged in order, item images included in a partial range of the list in a predetermined scroll direction, and displaying the item images in the partial range on a screen; and a scroll control step for moving the item images displayed on the screen in the scroll direction at a speed corresponding to a user's scroll instruction, and moving item images that have not been displayed on the screen in the scroll direction from outside of the screen into the screen so as to newly display the item images on the screen. The scroll control step includes, when the item image that is newly displayed is moved in the scroll direction into the screen, moving at least a part of the item image in a cross direction crossing the scroll direction from the outside of the screen into the screen at a predetermined speed.

Further, according to an exemplary embodiment of the present invention, there is further provided a non-transitory computer readable information storage medium such as an optical disc or a memory card having a program recorded thereon, the program causing a computer to the processing of: arranging, from a list including a plurality of item images arranged in order, item images included in a partial range of the list in a predetermined scroll direction, and displaying the item images in the partial range on a screen; and moving the item images displayed on the screen in the scroll direction at a speed corresponding to a user's scroll instruction, and moving item images that have not been displayed on the screen in the scroll direction from outside of the screen into the screen so as to newly display the item images on the screen. When the item image that is newly displayed is moved in the scroll direction into the screen, at least a part of the item image is moved in a cross direction crossing the scroll direction from the outside of the screen into the screen at a predetermined speed.

BRIEF DESCRIPTION OF THE DRAWINGS

In the accompanying drawings:

FIG. 3 is a diagram illustrating a screen before starting scroll;

FIG. 4A is a diagram illustrating a screen scrolling at low speed;

FIG. 7 is a diagram illustrating how objects indicating item images are arranged on an imaginary plane;

FIG. 8 is a diagram illustrating another example of the imaginary plane on which objects are arranged;

DETAILED DESCRIPTION OF THE INVENTION

Hereinafter, an embodiment of the present invention is described in detail with reference to the drawings.

Figure 1:
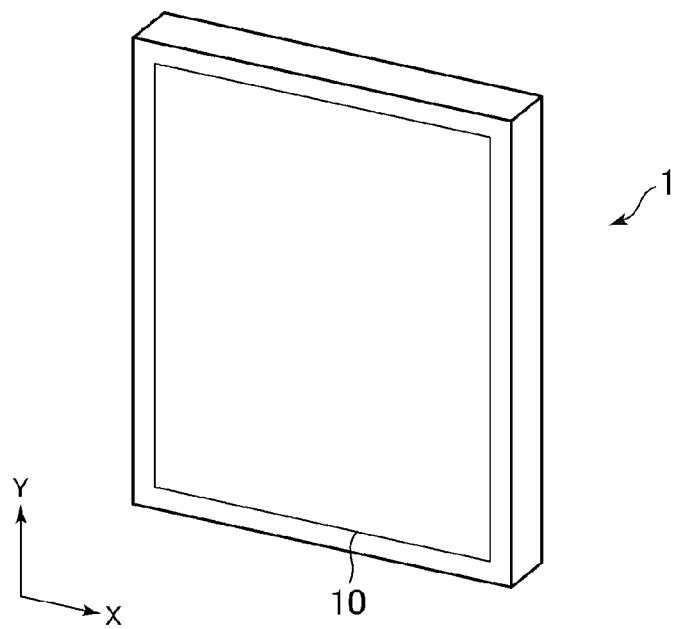
FIG. 1 is a perspective view illustrating an external view of a list display apparatus according to an embodiment of the present invention.

FIG. 1 is a perspective view illustrating an external view of a list display apparatus 1 according to an embodiment of the present invention. As illustrated in FIG. 1, the list display apparatus 1 is a portable information processing apparatus having a slim box case, in which a touch panel 10 is disposed on the front surface. This touch panel 10 includes a display 10a and a touch sensor 10b. The display 10a may be a liquid crystal display, an organic EL display or the like, and various images are displayed on the screen. The touch sensor 10b has a sensing surface overlaying the display screen of the display 10a, and detects a position of an object (for example, a user's finger or a stylus) contacting with the sensing surface and outputs the detection result. The touch sensor 10b may be various types of touch sensors, including a capacitance type and a pressure sensing type, for example. Note that, in the following description, a left and right direction in the touch panel 10 is referred to as an X axis direction, and an upper and lower direction is referred to as a Y axis direction. In addition, facing the screen, the right direction is referred to as an X axis positive direction, and the upper direction is referred to as a Y axis positive direction.

Figure 2:
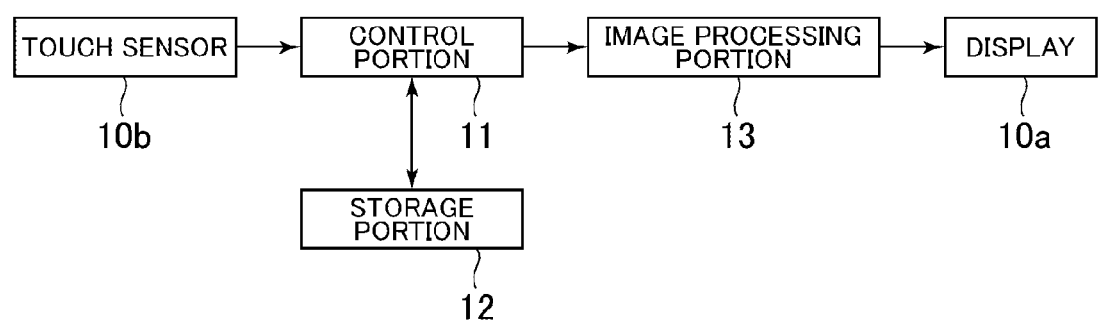
FIG. 2 is a block diagram illustrating a hardware configuration of the list display apparatus according to the embodiment of the present invention.

FIG. 2 is a block diagram illustrating a hardware configuration of the list display apparatus 1. As illustrated in FIG. 2, the list display apparatus 1 includes a control portion 11, a storage portion 12, and an image processing portion 13.

The control portion 11 is a CPU or the like, which performs various information processing according to a program stored in the storage portion 12. Particularly in this embodiment, the control portion 11 performs processing corresponding to various operational inputs performed by the user touching the touch sensor 10b with a finger. The storage portion 12 includes a memory element such as a RAM or a ROM so as to store a program performed by the control portion 11. In addition, the storage portion 12 functions also as a work memory of the control portion 11.

The image processing portion 13 includes a GPU and a frame memory, so as to render images to be displayed on the screen of the display 10a in accordance with an instruction from the control portion 11. Specifically, the image processing portion 13 renders images indicating objects arranged in an imaginary plane, in the frame memory. The images rendered in the frame memory are converted into image signals every predetermined period of time and are displayed on the screen of the display 10a.

Hereinafter, scroll control of a list by the list display apparatus 1 according to this embodiment is described with reference to explanatory diagrams of FIGS. 3 to 5C. The list display apparatus 1 displays a part of a list L constituted of a plurality of sorted item images I on a screen S of the display 10a. In this case, the list display apparatus 1 arranges and displays the item images I included in the list L in a predetermined direction (here, in the Y axis direction) on the screen. FIG. 3 illustrates the screen S displaying the plurality of item images I arranged in the Y axis direction as described above.

Each of the plurality of item images I is an image indicating a corresponding item, and the item may be various types of items, including a message posted by a user and a music or image file stored in the storage portion 12. In the following description, as a specific example, each of the item images I corresponds to one message posted by a user, which includes an icon image Iu indicating the user who posted the message and a message image Im indicating a content of the message. Each item image I has a rectangular shape elongated in the X axis direction, and the icon image Iu and the message image Im are arranged in the X axis direction. Note that, in the following description, an upper right point of each item image I is regarded as a representative point of the item image I, and a position of the item image I is expressed by position coordinates of the representative point. The list L is constituted of a plurality of item images I arranged in a predetermined order. Here, the list L contains N item images I(1) to I(N) arranged in an order of time when the message is posted. Among the N item images, five leading item images I(1) to I(5) are displayed on the screen S. Supposing that the position coordinates of the item image I(n) are (xn, yn), yn=y1−(n−1)Δy is satisfied, where Δy represents a distance between neighboring item images I. In addition, because the item images I are arranged linearly in the Y axis direction, xn has the same value for any of the item images I(n). In the following description, a position of each item image I(n) in the X axis direction in the stop state is referred to as a reference position xr.

When the user instructs to scroll in this state, the list display apparatus 1 moves the item images I displayed on the screen S in the scroll direction. Here, the scroll direction is the same as the direction in which the item images I are arranged on the screen S (namely, the Y axis direction). In this embodiment, the user slides a finger on the touch sensor 11 in the scroll direction as a scroll instruction. By this scroll control, the item images I that have not been displayed on the screen S are scrolled into the screen S and are newly displayed. Specifically, when the user performs an upward sliding operation in the state of FIG. 3, the item images I(1) to I(5) displayed on the screen S are moved upward and scrolled out in order from the item image I(1) from the upper side of the screen S. Instead, the item images I(6), I(7), and so on are newly scrolled in the screen S from the lower side in this order. By this scroll control, position coordinates of the item image I(n) that have been displayed before the scroll are changed to (xn, yn+vy·t), where t represents a lapse time from the start of the scroll, and vy represents a scroll speed (moving speed of each item image In in the Y axis direction corresponding to the scroll instruction).

Figure 4B:
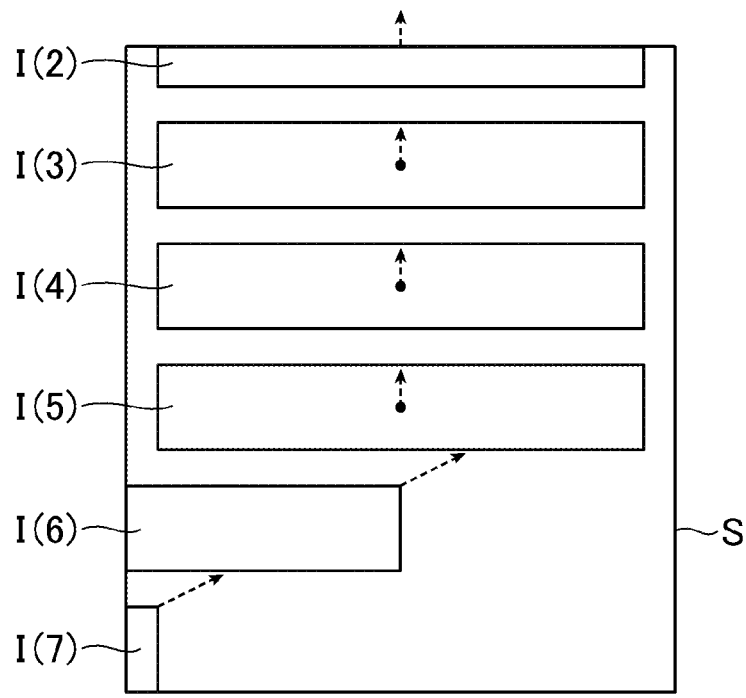
FIG. 4B is a diagram illustrating a screen scrolling at low speed.
Figure 4C:
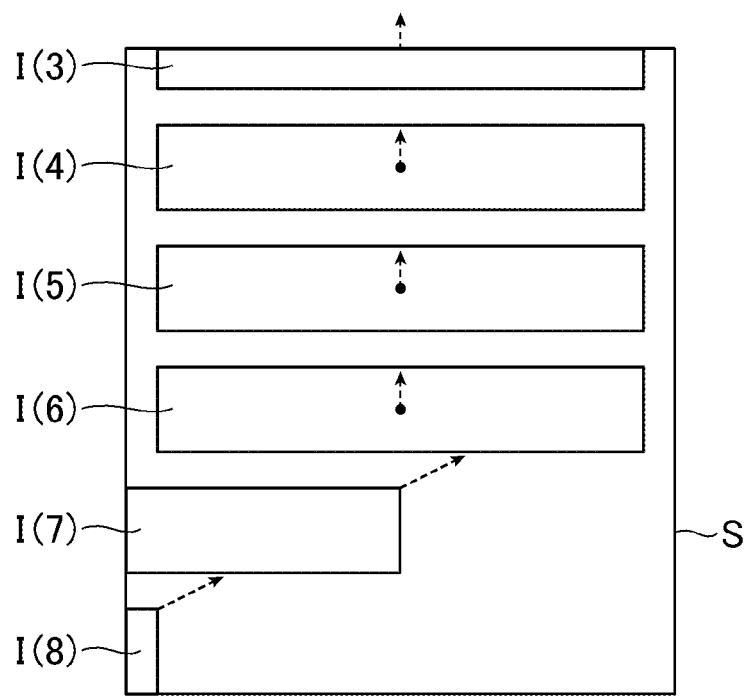
FIG. 4C is a diagram illustrating a screen scrolling at low speed.

Further in this embodiment, the list display apparatus 1 not only moves the item images I to be newly displayed on the screen S in response to the user's scroll instruction (hereinafter, referred to as newly displayed item images) in the scroll direction but also moves at least a part of the newly displayed item images in a cross direction crossing the scroll direction (here, in the X axis direction). More specifically, the list display apparatus 1 moves the newly displayed item images in the X axis direction from a predetermined initial position to the reference position xr as a target position. FIGS. 4A to 4C illustrate a display process of the newly displayed item images in a case where the user performs the scroll instruction in the Y axis positive direction in the state illustrated in FIG. 3. FIGS. 4A, 4B, and 4C sequentially illustrate how each item image I moves in the screen S with time. In this illustrated example, the newly displayed item image is moved from the left end of the screen S in the X axis positive direction. Note that, broken line arrows in the figures indicate moving directions of the item images I. Actually, the user image Iu and the message image Im inside the item image I are scrolled while being displayed in the screen S, but illustration inside the item image I is omitted for simple illustration in the following figures.

Figure 5A:
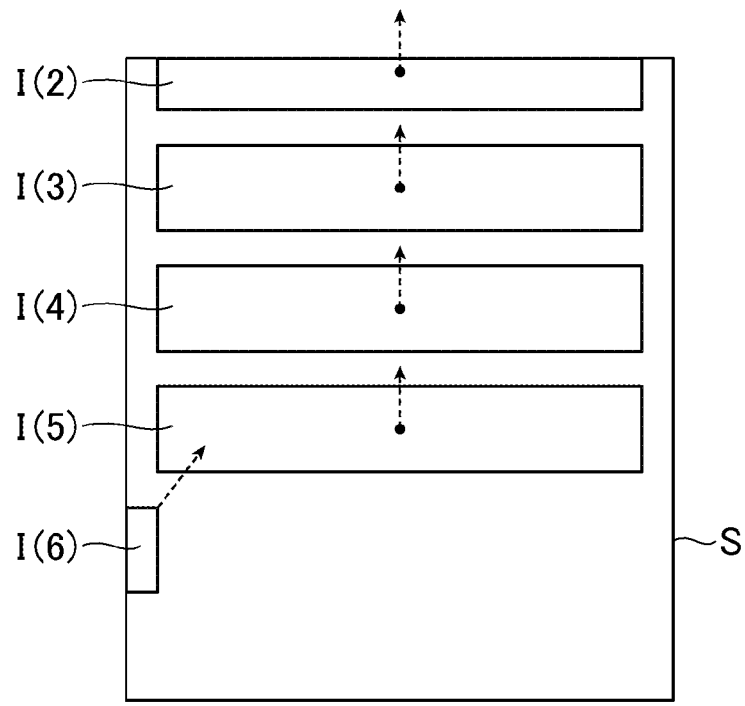
FIG. 5A is a diagram illustrating a screen scrolling at high speed.
Figure 5B:
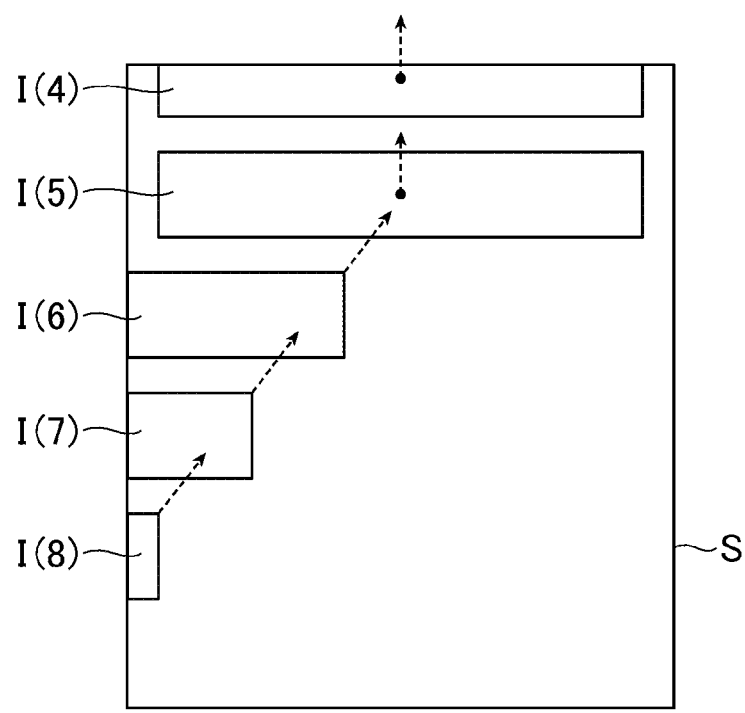
FIG. 5B is a diagram illustrating a screen scrolling at high speed.
Figure 5C:
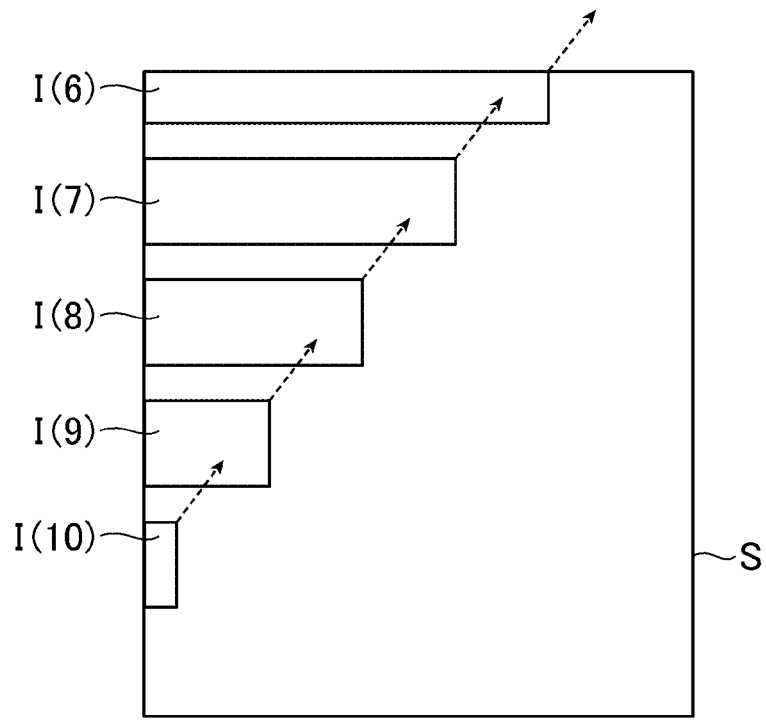
FIG. 5C is a diagram illustrating a screen scrolling at high speed.

Here, the list display apparatus 1 changes the scroll speed vy of the item images I in accordance with a content of the user's scroll instruction. Specifically, if the user moves a finger rapidly on the screen S, the item images I are moved at high scroll speed vy. If the user moves a finger slowly, the item images I are moved at low scroll speed vy. Note that, in either case, the list display apparatus 1 scrolls the item images I for a given period of time. On the other hand, the above-mentioned moving speed vx of the newly displayed item image in the X axis direction is constant regardless of the scroll speed vy. Therefore, if the scroll speed vy is a predetermined value or higher, the newly displayed item image may passes through the screen S in the Y axis direction to be scrolled out from the upper side of the screen S before the movement of the newly displayed item image in the X axis direction to the reference position xr is completed. In this case, at least a part of the newly displayed item image is not displayed at all in the screen S in a period from scroll-in to scroll-out. FIGS. 5A to 5C illustrate a movement process of the item images I in a case where the scroll speed vy is higher than the case illustrated in FIGS. 4A to 4C. In this illustrated example, the item image I(6) is scrolled out from the screen S without the left part being displayed in the screen S.

In this way, if the newly displayed item image that was not displayed before the start of the scroll is scrolled out before the entire newly displayed item image is displayed, the list display apparatus 1 is not required to render the entire newly displayed item image. On the other hand, if the newly displayed item image is simply scrolled in the Y axis direction without moving in the X axis direction, the scroll is performed in a state in which the entire newly displayed item image is displayed in the screen S. Therefore, the list display apparatus 1 is required to render the entire newly displayed item image. In other words, according to the scroll control of this embodiment, a load of the rendering process can be reduced as compared with the case where the entire newly displayed item image must be rendered without the moving control in the X axis direction. In particular, when the scroll is performed at high speed, it is almost unnecessary to render newly displayed item images passing through the screen S during the scroll process. Therefore, a load of the rendering process can be reduced so that the scroll process can be performed at high speed.

Note that, a newly displayed item image whose entire image is not displayed on the screen S when the scroll control is finished continues moving in the X axis direction after the scroll is finished, and always stops in the screen S when reaching the reference position xr. Thus, each of the entire item images I is displayed in the screen S in a state in which the scroll is stopped.

Figure 6:
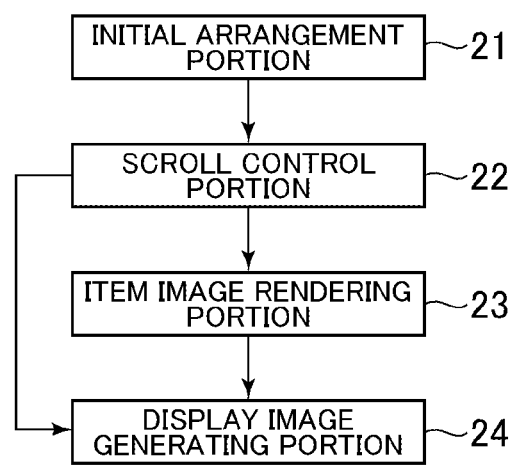
FIG. 6 is a functional block diagram illustrating a function of the list display apparatus according to the embodiment of the present invention.

Hereinafter, a function of the list display apparatus 1 to realize the above-mentioned scroll control is described with reference to a functional block diagram of FIG. 6. The list display apparatus 1 arranges objects O corresponding to the plurality of item images I, respectively, in the imaginary plane, and displays on the screen S the objects O included in a range R to be displayed in the imaginary plane. Here, the range R to be displayed is a range having a shape and a size corresponding to the screen S. The list display apparatus 1 includes, as illustrated in FIG. 6, as functions, an initial arrangement portion 21, a scroll control portion 22, an item image rendering portion 23, and a display image generating portion 24. Those functions are implemented by the control portion 11 executing the program stored in the storage portion 12. This program may be provided as being stored in a computer readable information storage medium such as an optical disc or a memory card, or may be provided to the list display apparatus 1 via a communication network such as the Internet.

When the list display apparatus 1 starts to display the list L, the initial arrangement portion 21 arranges the objects O corresponding to the item images I to be displayed initially on the screen S, in the imaginary plane. In a case where an initial screen illustrated in FIG. 3 is displayed, five objects O1 to O5 indicating the item images I(1) to I(5) are arranged in the imaginary plane. FIG. 7 illustrates how the objects O are arranged in the imaginary plane. Five objects O are arranged side by side in the Y axis direction in the range R to be displayed. Note that, an object O6 indicating the item image I(6) to be displayed next when the scroll control is performed is arranged in the outside of the range R to be displayed as illustrated in FIG. 7. In this embodiment, in order to realize the above-mentioned moving control in the cross direction, a position coordinate of the X axis of the object O6 is shifted from the reference position xr of the objects O1 to O5, which are already included in the range R to be displayed, by a width of each object O or larger. The position coordinate of the X axis of the object O6 in this state is set as an initial position xi.

The scroll control portion 22 receives the user's scroll instruction after the initial arrangement portion 21 has arranged the object O and moves the objects O in the imaginary plane in response to the instruction. Here, as described above, the scroll control portion 22 not only moves the objects O in the scroll direction (Y axis direction) in response to the scroll instruction but also moves the object O corresponding to the newly displayed item image (the object O6 in the example of FIG. 7) in the direction crossing the scroll direction (in the X axis direction). By this moving control, as to the object O corresponding to the newly displayed item image, the Y axis position coordinate thereof is included in the range R to be displayed, and then the X axis position coordinate is moved from the initial position xi to the reference position xr.

Note that, in this embodiment, even if the number of item images I included in the list L is large, the list display apparatus 1 arranges, in the imaginary plane, only the objects O of the number corresponding to the largest number of item images I that can be displayed in the screen S at one time. Specifically, in the example of FIG. 3, the five item images I are displayed when the scroll control is not performed, and only at most six item images I are displayed in the screen S even while the scroll is being performed. Therefore, the initial arrangement portion 21 arranges only six objects O1 to O6 in the imaginary plane. When one of the objects O moves from the inside to the outside of the range R to be displayed by the scroll control (namely, scrolls out), the scroll control portion 22 updates the position coordinates of the object O and reuses the object O as an object O corresponding to the newly displayed item image. In the example of FIG. 7, when the instruction for scrolling the item images I upward in the screen S is issued, the object O1 is first scrolled out from the range R to be displayed. This object O1 is moved to the position below the range R to be displayed, at which the object O6 was arranged before the start of the scroll, and is reused as the object O indicating the item image I(7). Further, while the scroll control is being continued, the object O2 is rearranged for displaying the item image I(8), and the object O3 is rearranged for displaying the item image I(9), in order.

The item image rendering portion 23 renders the item image I to be displayed on the screen S and pastes the rendered item image as texture to the objects O1 to O6. For instance, the item image rendering portion 23 generates the icon image Iu of a bitmap format included in each item image I based on image data of the user icon stored in the storage portion 12. In addition, the message image Im is generated based on text data of the posted message. Then, the generated icon image Iu and the generated message image Im are pasted to the corresponding object O. Thus, each object O can indicate the corresponding item image I.

Here, at timing when the scroll control portion 22 receives the scroll instruction, the item image rendering portion 23 starts to render the item image I to be displayed next as a newly displayed item image. However, if the scroll speed vy is a given value or higher and it is expected that the item image I will be scrolled out before the entire item image I to be rendered next is displayed in the screen S, rendering of at least a part of the item image I is restricted. Thus, a load of the rendering process by the item image rendering portion 23 can be reduced. Note that, the item image rendering portion 23 may restrict the rendering by a texture unit to be pasted to individual objects O. For instance, in the example of FIGS. 5A to 5C, the message image Im included in the item image I(6) is displayed on the screen S, but the icon image Iu is not displayed in the screen S until the item image I(6) is scrolled out, because the scroll speed vy is high. In this case, the item image rendering portion 23 renders the message image Im included in the item image I(6) but does not render the icon image Iu.

The display image generating portion 24 instructs the image processing portion 13 to generate images of the objects O included in the range R to be displayed every predetermined period of time and to display the generated images on the screen S. In other words, the display image generating portion 24 generates the image indicating the objects O to which the textures rendered by the item image rendering portion 23 are pasted and which are moved by the scroll control portion 22 in the range R to be displayed. Thus, on the screen S, how a plurality of item images I are scrolled in response to the user's instruction is displayed.

In the above description, it is possible to control the timing of starting to display the newly displayed item image on the screen S during the scroll by adjusting the initial position xi of the object O indicating the newly displayed item image in the imaginary plane. Here, the scroll control portion 22 starts the movement of the object O in the X axis direction when the Y axis position coordinate of the upper end or the lower end of the object O matches the position of the range R to be displayed in the Y axis direction by the scroll instruction. In the example of FIG. 7, when the Y axis position coordinate of the object O becomes y0 or larger, the movement of the object O in the X axis direction is started. Note that, in a case where the objects O are scrolled downward, if the position coordinate of the lower end of the object O becomes ymax or smaller, the movement of the object O in the X axis direction is started. In this case, as a distance from the initial position xi of the object O to the left end x0 of the range R to be displayed (d in FIG. 7) becomes longer, a longer period of time is necessary for the right end of the object O to enter the range R to be displayed after the start of the movement of the object O in the X axis direction. Therefore, by determining the initial position xi so that the distance d becomes larger, it is possible to control so that the newly displayed item image is scrolled out without being displayed at all in the screen S in a case where the scroll speed vy is fast to some extent. In addition, if the distance d is large, even if a part of the newly displayed item image is displayed in the screen S until being scrolled out, the display range becomes relatively smaller. Note that, instead of adjusting the initial position xi of the object O, it is possible to adjust a delay time, which is a time from when the Y axis position of the object O is included in the range R to be displayed to when the movement of the object O in the X axis direction is started. If the delay time is set to zero, the object O promptly enters the range R to be displayed. However, if the delay time is set long, the object O hardly enters the range R to be displayed. Therefore, if the delay time is set long, it is possible to prevent the newly displayed item image from being displayed in the screen S even if the scroll speed vy is relatively slow.

In addition, instead of adjusting the initial position xi of the object O itself, a position of the texture to be pasted to the object O may be adjusted. In other words, a width of the object O is set longer than a total width of the icon image Iu and the message image Im to be pasted as texture, to thereby secure a margin at the right end of the object O. Thus, when the object O moves in the X axis direction, the message image Im is not promptly displayed, and it takes a longer time for the display of the icon image Iu to be started. Therefore, there is higher probability that it is not necessary to render the icon image Iu and the message image Im. Note that, in this case, if the surface of the object O has no pattern, it is possible to reduce display processing load when a part of the object O other than the region to which the icon image Iu and the message image Im are pasted is displayed in the screen S.

Note that, if the newly displayed item image is not displayed at all in the screen S when the scroll speed vy is fast by the above-mentioned adjustment, the user cannot grasp how fast the scroll is being performed and how many number of item images I have passed the screen S. As countermeasures, it is possible to display a scroll bar on an end of the screen S so as to indicate which part of the list L is currently displayed on the screen S. In addition, it is possible to determine the initial position xi so that the right end of the object O is always included in the range R to be displayed. Hence, the right end of the object O is always displayed on the screen S even if the scroll speed vy is fast. In this case, the initial position xi of the object O corresponding to the newly displayed item image is positioned to overlap the range R to be displayed along the X axis direction. In other words, xi>x0 is satisfied. FIG. 8 illustrates an initial arrangement of the objects O in this case. In this case too, a margin is secured at the right end of the object O, and the part that is always displayed in the screen S is set to the part without a pattern other than the icon image Iu and the message image Im. Then, although the right end of the object O is always displayed in the screen S, a load of the rendering process is not so large.

Figure 9:
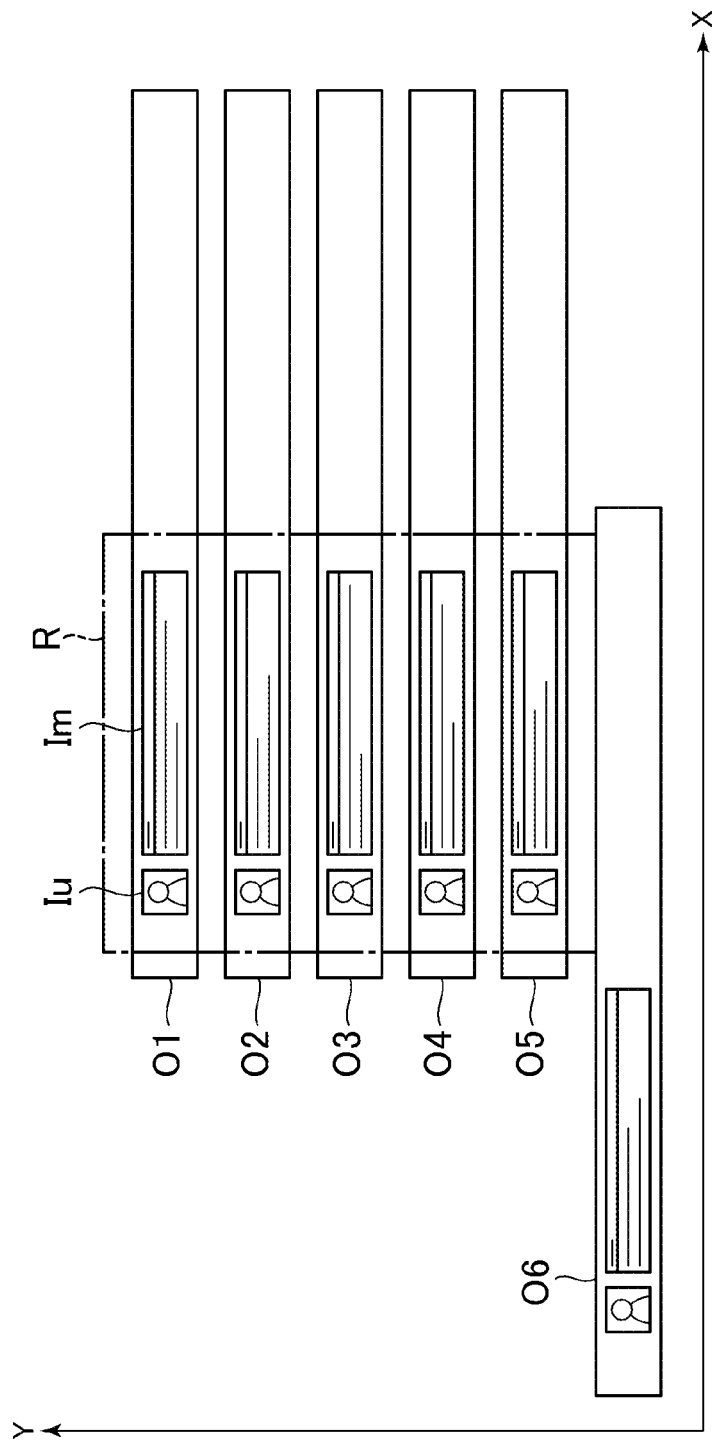
FIG. 9 is a diagram illustrating still another example of the imaginary plane on which objects are arranged.

In addition, it is possible to prepare an object O having a length larger than the width of the range R to be displayed, and to paste, for the object O corresponding to the newly displayed item image, the texture rendered by the item image rendering portion 23 to a position that is not included in the range R to be displayed. FIG. 9 illustrates an initial arrangement of the objects O in this case. In this example, each object O has a width corresponding to a length penetrating the range R to be displayed in the left and right direction, and the item image I constituted of the icon image Iu and the menu image Im is arranged at the position included in the range R to be displayed as for the objects O1 to O5 that are included in the range R to be displayed before the scroll. On the other hand, the object O6 corresponding to the newly displayed item image is arranged at a position shifted from the objects O1 to O5 in the X axis direction, and is arranged in the imaginary plane so that the position in the X axis direction overlaps the range R to be displayed. Thus, even if the object O6 is scrolled out before the newly displayed item image pasted to the object O6 is displayed in the screen S, how the part of the object O6 without a pattern moves in the screen S is displayed.

Note that, in the description described above, the case where the item image I is scrolled upward is exemplified. However, it is possible to perform the same control of moving the item image I in the X axis direction also in the case where the item image I is scrolled downward on the screen.

In addition, in the list display apparatus 1 according to this embodiment, in the state in which the item image I of an end (the top or the last) of the list L is displayed on the screen S, if a scroll instruction to move before the top or after the end is issued, the item image I displayed in the screen S may be vibrated at that position for a given period of time so as to inform the user that further scroll is impossible. The vibration direction in this case may be the cross direction crossing the scroll direction or may be randomly determined directions. In addition, in this case, vibration amplitude of each item image I may be changed in accordance with a position of the item image I in the list L. For instance, the item image I at the end of the list L is vibrated most largely, and the vibration amplitude is set smaller as being farther from the end. Alternatively, the vibration amplitude may be changed in accordance with the content of the scroll instruction. For instance, if an instruction to scroll at higher scroll speed vy is issued, the item image I may be vibrated more largely. By performing this display, the user can easily grasp that the item image I at the end of the list L is already displayed on the screen S and that further scroll is impossible.

According to the list display apparatus 1 of this embodiment described above, if the scroll speed vy is fast, while a certain item image I is passing the screen S by scroll operation, at least a part of the item image I is not displayed on the screen S. Thus, a processing load of rendering the item image I can be reduced.

Note that, the present invention is not limited to the above description. For instance, in the above description, the newly displayed item image is moved from the left to the right facing the screen S, but the item image I may be moved in the opposite direction. In addition, the direction of the movement in the X axis direction may be changed for each item image I. As a specific example, the direction of the movement in the X axis direction may be changed alternately for a plurality of item images I that are newly scrolled in the screen S. In this case, odd item images I move into the screen S from the right while even item images I move into the screen S from the left, and hence the item images I that are newly displayed move in alternately from the left and the right. In addition, it is possible to change the move-in direction depending on types of the item image I. As an example, it is possible to adopt a configuration in which the item image I indicating a message posted by the user itself of the list display apparatus 1 moves into the screen S from the left, while the item image I indicating a message posted by other user moves into the screen S from the right. Further, the direction of the movement in the X axis direction may be determined depending on the type and arrangement of display elements included in the item image I. Specifically, if a display element having a relatively high processing load of rendering and a display element having a relatively low processing load of rendering are included in the item image I side by side, the direction of the movement in the X axis direction is determined so that the display element having a low processing load first moves into the screen S. Also in the examples described above, because the rendering process of the message image Im formed of only characters is easier than that of the user image Iu, the newly displayed item image is moved to the right so that the message image Im arranged on the right of the item image I is displayed earlier than the user image Iu. Thus, there is higher probability that it is not necessary to render the icon image Iu having a higher processing load. In particular, if the arrange order of the internal display element is changed for each item image I, the load of the rendering process can be reduced by specifying a display element having a high processing load in each item image I and by determining the direction of the movement in the X axis direction of each item image I so that the display element moves later in the screen S.

In addition, the scroll direction is the Y axis direction, and the cross direction is the X axis direction in the above description, but the scroll direction and the cross direction may be exchanged. In other words, it is possible to adopt a configuration in which when the item images I arranged in the X axis direction are scrolled in the X axis direction, the newly displayed item image is moved in the Y axis direction so as to be displayed in the screen S.

Figure 10:
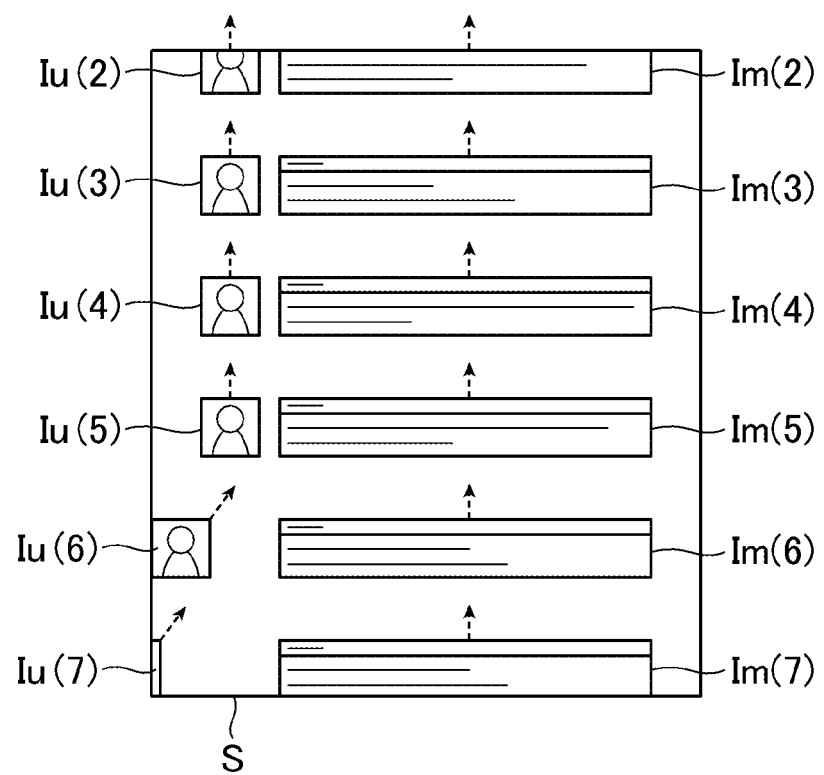
FIG. 10 is a diagram illustrating a display example in which only a part of the item image is moved along an X axis direction.

In addition, the entire object O indicating the newly displayed item image is moved in the X axis direction in the above description. However, it is possible to move only a part of the object O in the X axis direction, while other part is not moved in the X axis direction but is simply moved in the scroll direction. Specifically, for example, a display element having a low processing load such as the message image Im is not moved in the X axis direction, while only a display element having a high processing load such as the icon image Iu is moved in the X axis direction so as to move from the outside of the screen S to a predetermined position inside the screen S. FIG. 10 illustrates the display on the screen S during scroll in this example. Here, the icon image Iu and the message image Im forming the item image I(n) are represented by Iu(n) and Im(n), respectively. In addition, moving directions of the display elements are indicated by broken line arrows. In this example, the message images Im are all scrolled in the Y axis positive direction. Among the icon images Iu, the icon images Iu(2) to Iu(5) that have been displayed before the scroll operation are scrolled in the Y axis positive direction, but the icon images Iu(6) and Iu(7) are moved not only in the scroll direction but also in the X axis positive direction, so as to move from the left end of the screen S into the screen S. Thus, when the scroll speed vy is fast, it is necessary to render all the message images Im, but it is possible to omit rendering of the icon images Iu.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A list display apparatus having a processor, comprising:
a list display control portion for arranging, using the processor, linearly in a predetermined scroll direction, from a list including a plurality of item images arranged in order, item images included in a partial range of the list, and displaying all of the item images in the partial range linearly on a screen; and
a scroll control portion for moving the item images displayed linearly on the screen in the predetermined scroll direction linearly at a speed proportional to a user's scroll instruction, and moving item images that have not been displayed on the screen from outside an edge of the screen into the screen so as to newly display the item images on the screen,
wherein, when the scroll control portion moves the item image that is newly displayed in the scroll direction into the screen, the scroll control portion moves at least a part of the item image in a cross direction crossing the predetermined scroll direction from the outside the edge of the screen into the screen at a predetermined speed,
wherein a component of the predetermined speed of the newly displayed item images perpendicular to the predetermined scroll direction is constant regardless of a component of the predetermined speed of the newly displayed item images parallel to the predetermined scroll direction, and
wherein the component of the predetermined speed of the newly displayed item images parallel to the predetermined scroll direction is proportional to the speed of the user's scroll instruction in the predetermined scroll direction.

2. The list display apparatus according to claim 1, wherein:
each of the plurality of item images includes a plurality of display elements arranged in the cross direction;
the list display apparatus further comprises an item image rendering portion for rendering each of the plurality of display elements included in the item image that is newly displayed on the screen by the scroll control portion; and
the item image rendering portion excludes, from among the plurality of display elements, a display element that is not displayed on the screen in a period during which the newly displayed item images pass the screen from a target of rendering.

3. The list display apparatus according to claim 1, wherein the scroll control portion moves the newly displayed item image in the cross direction starting from an initial position at which an end of the newly displayed item image in the cross direction is included in the screen.

4. The list display apparatus according to claim 1, wherein the scroll control portion starts moving the newly displayed item image in the cross direction when a predetermined delay time has elapsed after a position of the newly displayed item image in the scroll direction is included in the screen.

5. A list display control method, comprising:
a list display control step for arranging linearly in a predetermined scroll direction, from a list including a plurality of item images arranged in order, item images included in a partial range of the list, and displaying all of the item images in the partial range linearly on a screen; and
a scroll control step for moving the item images displayed linearly on the screen in the predetermined scroll direction linearly at a speed proportional to a user's scroll instruction, and moving item images that have not been displayed on the screen from outside an edge of the screen into the screen so as to newly display the item images on the screen,
wherein the scroll control step includes, when the item image that is newly displayed is moved in the scroll direction into the screen, moving at least a part of the item image in a cross direction crossing the predetermined scroll direction from the outside the edge of the screen into the screen at a predetermined speed,
wherein a component of the predetermined speed of the newly displayed item images perpendicular o the predetermined scroll direction is constant regardless of a component of the predetermined speed of the newly displayed item images parallel to the predetermined scroll direction, and
wherein the component of the predetermined speed of the newly displayed item images parallel to the predetermined scroll direction is proportional to the speed of the user's scroll instruction in the predetermined scroll direction.

6. A non-transitory computer readable information storage medium having a program recorded thereon, the program causing a computer to the processing of:
arranging linearly in a predetermined scroll direction, from a list including a plurality of item images arranged in order, item images included in a partial range of the list, and displaying all of the item images in the partial range linearly on a screen; and
moving the item images displayed linearly on the screen linearly in the predetermined scroll direction at a speed proportional to a user's scroll instruction, and moving item images that have not been displayed on the screen from outside an edge of the screen into the screen so as to newly display the item images on the screen,
wherein, when the item image that is newly displayed is moved in the scroll direction into the screen, at least a part of the item image is moved in across direction crossing the scroll direction from the outside of the screen into the screen at a predetermined speed,
wherein a component of the predetermined speed of the newly displayed item images perpendicular to the predetermined scroll direction is constant regardless of a component of the predetermined speed of the newly displayed item images parallel to the predetermined scroll direction, and
wherein the component of the predetermined speed of the newly displayed item images parallel to the predetermined scroll direction is proportional to the speed of the user's scroll instruction in the predetermined scroll direction.

* * * * *